US009805137B2

(12) United States Patent
Deshmukh et al.

(10) Patent No.: US 9,805,137 B2
(45) Date of Patent: *Oct. 31, 2017

(54) VIRTUALIZING SCHEMA RELATIONS OVER A SINGLE DATABASE RELATION

(71) Applicant: International Business Machines Corporation, Armonk, NY (US)

(72) Inventors: Harish Deshmukh, Mountain View, CA (US); Roger C. Raphael, San Jose, CA (US); Paul S. Taylor, Redwood City, CA (US); Gabriel Valencia, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/687,164

(22) Filed: Apr. 15, 2015

(65) Prior Publication Data

US 2016/0092503 A1    Mar. 31, 2016

Related U.S. Application Data

(63) Continuation of application No. 14/501,234, filed on Sep. 30, 2014.

(51) Int. Cl.
*G06F 17/30* (2006.01)
(52) U.S. Cl.
CPC .. *G06F 17/30917* (2013.01); *G06F 17/30448* (2013.01)

(58) Field of Classification Search
CPC ......... G06F 17/30595; G06F 17/30917; G06F 17/30297; G06F 17/30607; G06F 17/30498; G06F 17/30448; G06F 17/30289; G06F 17/30979; G06F 17/30286; G06F 17/30442
USPC .... 707/999.1, 802, 954, 99.2, E17.125, 756, 707/763, E17.014, 803, 999.102, E17.044, 707/609
See application file for complete search history.

(56) References Cited

U.S. PATENT DOCUMENTS 5,819,251 A * 10/1998 Kremer ............. G06F 17/30595
6,418,448 B1    7/2002 Sarkar
(Continued)

OTHER PUBLICATIONS

Li et al.; "A Method of Building Virtual Datacenter Based on Semantic Views", e-Business Engineering (ICEBE), 2011 IEEE 8th International Conference on, Oct. 19-21, 2011, pp. 31-35.
(Continued)

*Primary Examiner* — Robert Beausoliel, Jr.
*Assistant Examiner* — Pedro J Santos
(74) *Attorney, Agent, or Firm* — Farrokh Pourmirzaie; SVL IPLaw

(57) ABSTRACT

According to one embodiment of the present invention, a system maps one or more virtual relations to a table of a relational database management system. The system generates a structured query language (SQL) statement for the table from a SQL statement for a virtual relation by applying the mapping to one or more elements of the SQL statement for the virtual relation. Embodiments of the present invention further include a method and computer program product for mapping virtual relations to a table in substantially the same manners described above.

10 Claims, 10 Drawing Sheets

(56) References Cited

U.S. PATENT DOCUMENTS

| | | | |
|---|---|---|---|
| 6,694,306 B1 | 2/2004 | Nishizawa et al. | |
| 7,536,409 B2 | 5/2009 | Barcia | |
| 8,122,066 B2 | 2/2012 | Castellanos et al. | |
| 8,140,558 B2 | 3/2012 | Kiefer et al. | |
| 8,204,848 B2 | 6/2012 | Sinha | |
| 8,452,808 B2 | 5/2013 | Dove et al. | |
| 8,631,034 B1 * | 1/2014 | Peloski | G06F 17/5009 706/12 |
| 2002/0059259 A1 * | 5/2002 | Cotner | G06F 17/30415 |
| 2002/0107840 A1 * | 8/2002 | Rishe | G06F 17/30392 |
| 2005/0289174 A1 | 12/2005 | Kolli et al. | |
| 2009/0248710 A1 * | 10/2009 | McCormack | G06F 17/30604 |
| 2011/0179015 A1 | 7/2011 | Balebail | |
| 2013/0060816 A1 | 3/2013 | Hui et al. | |

OTHER PUBLICATIONS ip.com et al.; "A Method and System for Dynamically Mapping and Replacing SQL Statements in a Relational Database", IPCOM000192772D, Feb. 2, 2010, pp. 1-3.

Trzaska, Mariusz; "Virtual Schemas in Visual Interfaces to Databases", Krajowa Konferencja Naukowa Technologie Przetwarzania Danych, Poznan, Sep. 28-28, 2005, pp. 361-371.

List of IBM Patents or Patent Applications Treated as Related, Apr. 15, 2015.

* cited by examiner

VIRTUALIZING SCHEMA RELATIONS OVER A SINGLE DATABASE RELATION

CROSS-REFERENCE TO RELATED APPLICATIONS

This application is a continuation of U.S. patent application Ser. No. 14/501,234, entitled "VIRTUALIZING SCHEMA RELATIONS OVER A SINGLE DATABASE RELATION" and filed Sep. 30, 2014, the disclosure of which is incorporated herein by reference in its entirety.

BACKGROUND

Present invention embodiments relate to database technology, and more specifically, to virtualizing relations of a schema by mapping those virtual relations to a single underlying real database relation.

In a relational database, information is organized into one or more relations (also referred to as tables). Each relation comprises a set of records (also referred to as rows) having a common set of attributes (also referred to as fields or columns). The structure of the database (e.g., the tables, the columns of each table, the data types of each column, and other constraints) is governed by the database schema, which may be defined using a data definition language (DDL). Conventional relational database management systems (RDBMSs) support common features of Structured Query Language (SQL), including the data definition language (DDL) elements CREATE, DROP, and ALTER, and the data manipulation (DML) elements INSERT, DELETE, SELECT, and UPDATE.

Changes to a relational database schema may be inefficient. For example, an ALTER TABLE operation may take a long time to process because the underlying data must be physically restructured. The process of restructuring the data may require additional storage that is two or three times greater than the table size. As a result, non-relational data stores (e.g., SPARQL_RDF, Triple Store, etc.) have been increasingly adopted for data domains where schema flexibility is desired. These non-relational data stores require reinvention of query languages, query optimization, indexing, and storage management and transaction management with ACID (atomicity, consistency, isolation, and durability) properties, which modern relational database technology already provide.

SUMMARY

According to one embodiment of the present invention, a system maps one or more virtual relations to a table of a relational database management system. The system generates a structured query language (SQL) statement for the table from a SQL statement for a virtual relation by applying the mapping to one or more elements of the SQL statement for the virtual relation. Embodiments of the present invention further include a method and computer program product for mapping virtual relations to a table of a relational database management system in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments map objects (referred to as types) of a database schema to a single underlying database relation using a type mapping system. Types are analogous to real tables in a relational database schema, collections in MONGODB®, and the like. The schema to which the mapped types belong is referred to as a virtual schema.

In an example embodiment, the virtual schema is a relational schema with types corresponding to relations or tables (referred to as virtual relations). An instance of an object of a type corresponds to a row of a virtual relation. A user may modify the virtual relational schema using common SQL DDL statements (e.g., CREATE, ALTER, and DROP), and may access rows of a virtual relation using common SQL DML statements (e.g., INSERT, DELETE, SELECT, and UPDATE). The virtual relational schema may include a plurality of virtual relations, each mapped (or multiplexed) to the same underlying database relation. An application service mediates interaction between users and a database management system (DBMS) that manages the underlying database relation.

One aspect of a present invention embodiment is to provide schema flexibility in a data store that may employ a query language, query optimization, indexing, storage management, and other features of modern relational databases. For example an ALTER TABLE operation may be performed against a virtual relation in the virtual schema without incurring typical overheads of physically restructuring stored data that potentially would be very large if a real relation were used, since in a present invention embodiment the physical schema of the underlying relation remains the same while simply adjusting the metadata within the type mapping system. Another aspect is to track schema evolution. Still another aspect is to provide standard transactional behavior respecting atomicity, consistency, isolation, and durability (ACID). Yet another aspect is to provide optimization for data domains in which the attributes of a data record or object may be sparsely populated.

Figure 1:
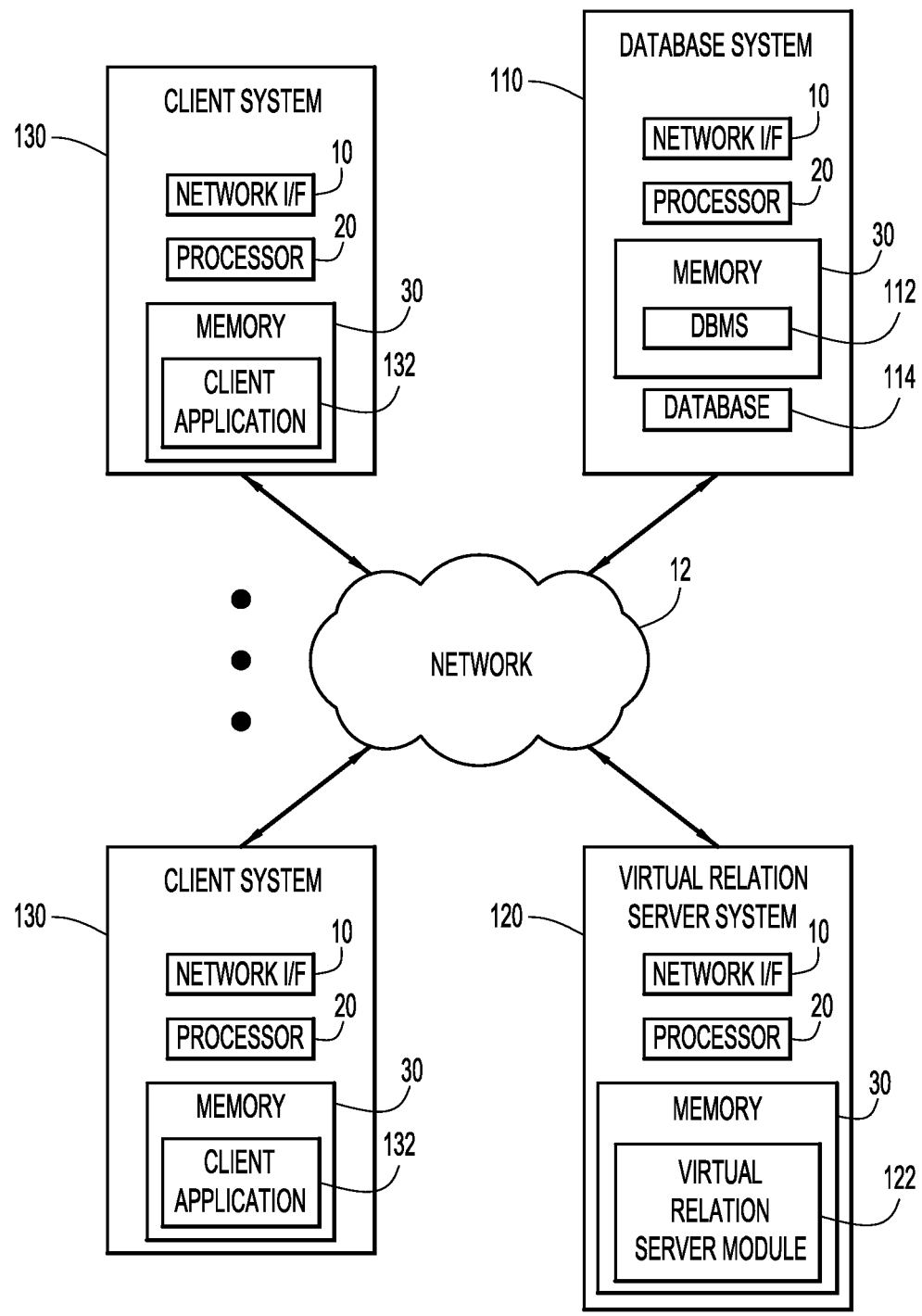
FIG. 1 is a diagrammatic illustration of an example environment for an embodiment of the present invention.

An example environment for present invention embodiments is illustrated in FIG. 1. Specifically, the environment includes database system 110, virtual relation server system 120, and one or more client or end-user systems 130. Database system 110, virtual relation server system 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of database system 110, server system 120, and/or client systems 130 may be local to each other, and communicate via any appropriate local communication medium (e.g., local area network (LAN), hardwire, wireless link, intranet, etc.).

Database system 110 includes database management system (DBMS) 112 and database 114. DBMS 112 (e.g., a conventional relational DBMS) manages database 114.

Virtual relation server system 120 includes virtual relation server module 122. The virtual relation server module may be implemented across plural server systems. Alternatively, the virtual relation server module may reside on database system 110, client system 130, or other computer system in communication with a client application and DBMS 114.

Client systems 130 include client application 132 and enable users to communicate with the virtual relation server module (e.g., via network 12). Client application 132 may be a conventional relational database client. The client systems may present (e.g., via client application 132) any graphical user (e.g., GUI, etc.) or other interface (e.g., command line prompts, menu screens, etc.) to receive commands from users and interact with the virtual relation server module and/or other modules or services.

Database system 110, virtual relation server system 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software (e.g., database software, communication software, etc.).

The virtual relation server module may include one or more modules or units (e.g., SQL statement constructor, sorter, tuple constructor, a projection block handler module, etc.) to perform the various functions of present invention embodiments described below (e.g., analyzing SQL statements received from client application 132 and generating SQL statements for DBMS 112, sorting query results, filtering and formatting query results from DBMS 112 for client application 132, etc.), may be implemented by any combination of any quantity of software and/or hardware modules or units, and may reside within memory 30 of a virtual relation server system, database server system, and/or client systems for execution by processor 20.

Figure 2:
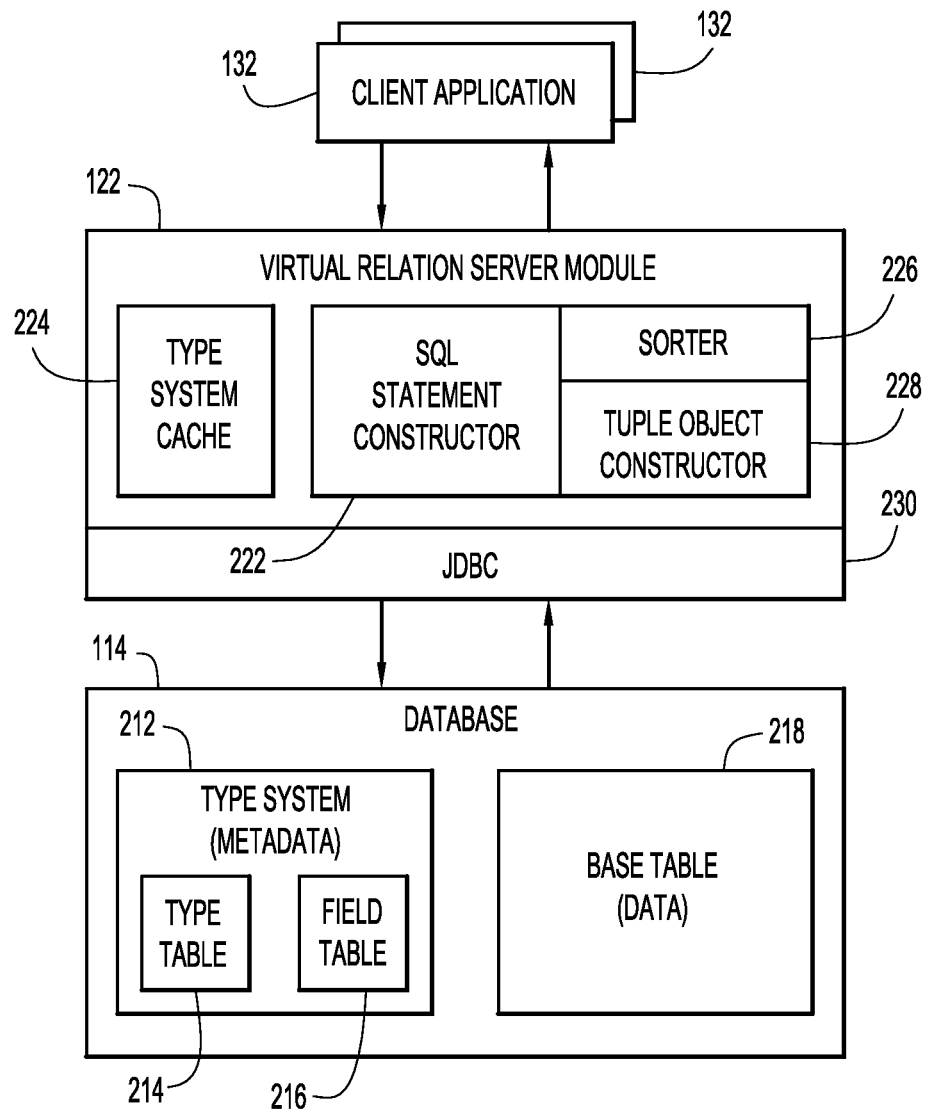
FIG. 2 is a block diagram of an example virtual relation server module, database, and client application according to an embodiment of the present invention.

An example virtual relation server module, database, and client application according to an embodiment of the present invention are illustrated in FIG. 2. Virtual relation server module 122 receives SQL statements from client applications 132 and communicates with DBMS 112 (e.g., via Java Database Connectivity (JDBC) driver 230) to access database 114. Virtual relation server 122 includes a SQL statement constructor module 222 and may include type system cache 224, sorter module 226, and tuple constructor 228. Database 114 includes type table 214, field table 216, and base table 218. Base table 218 provides the database relation underlying the virtual schema. Type table 214 and field table 216 make up type system 212.

Type system 212 comprises metadata describing at least one virtual schema. Each type (or virtual relation) in the virtual schema has a name that may operate as, e.g., a name of a table in a SQL statement sent from client application 132 to virtual relation server module 122. In addition, each type may have a unique identifier (ID), one or more versions numbers, and a description. This information is stored in corresponding columns of type table 214. Example names and data types for the columns of type table 214 are listed in Table. 1.

TABLE 1

Columns of the Type Table:

| Name | Data Type |
| --- | --- |
| TYPE_ID | INTEGER |
| TYPE_VERSION | INTEGER |
| TYPE_NAME | STRING |
| TYPE_DESCRIPTION | STRING |

Each type (or virtual relation) has one or more fields. Each field has a name that may operate as, e.g., a name of a column in a SQL statement sent from client application 132 to virtual relation server module 122. In addition, each field may have a field identifier, a description, and a container identifier. The container identifier indicates the manner in which values of the field are stored in base table 218 and may be constrained to values from 1 to N, inclusive, where N is the number of data storage types (e.g., integer, double precision, string, etc.) provided in base table 218. Each field identifier, name, description, container identifier, and the identifier and version of the type to which the field belongs is stored in a corresponding column of field table 216. The fields may be globally unique, e.g., with uniqueness imposed on the FIELD_NAME column. Alternatively, fields may be unique only within a type. Example names and data types for the columns of field table 216 are listed in Table. 2.

TABLE 2

Columns of the Field Table:

| Name | Data Type |
| --- | --- |
| TYPE_ID | INTEGER |
| TYPE_VERSION | INTEGER |
| FIELD_ID | INTEGER |
| FIELD_NAME | STRING |
| FIELD_DESCRIPTION | STRING |
| CONTAINER_ID | INTEGER (Range 1-N) |

Each row of base table 218 stores an individual instance of a field value and information associating that value with its corresponding virtual relation and field. In particular, base table 218 includes columns for type identifier, type version, field identifier, instance identifier, and one or more data containers. Example names and data types for the columns of base table 218 are listed in Table. 3.

TABLE 3

Columns of the Base Table:

| Name | Data Type |
|---|---|
| TYPE_ID | INTEGER |
| TYPE_VERSION | INTEGER |
| FIELD_ID | INTEGER |
| INSTANCE_ID | LARGE INTEGER |
| CONTAINER_1 | INTEGER |
| CONTAINER_2 | FLOAT |
| CONTAINER_3 | STRING |

The type identifier and type version are foreign keys pointing into type table 214. The field identifier is a foreign key pointing into field table 216. Each row of the base table includes an instance identifier value that is unique to an instance of the virtual relation (i.e., it identifies a virtual row of the virtual relation). In the column names of the form CONTAINER_X, the number X indicates a data type (e.g., integer, float, string, etc.) and corresponds to the associated value in the CONTAINER_ID column in the field table. For example, if a particular field of a virtual relation has an integer data type, the container identifier (the value in the CONTAINER_ID column of the field table) for that field will have a value of one. A value of that field will be stored in the CONTAINER_1 column of a row in the base table, and the other container columns in that row will have NULL values. The data types of the container columns may be chosen to be large enough to accommodate any related data type supported in a virtual schema. For instance, CONTAINER_1 may have a 64-bit integer data type, and virtual schema fields declared as having any integer type up to 64 bits in size may be mapped to CONTAINER_1. The base table may include additional container columns for other data types (e.g., timestamp, array, etc.). Alternatively, the base table may include fewer columns (e.g., all data types may be converted to text and stored as a string).

Figure 3:
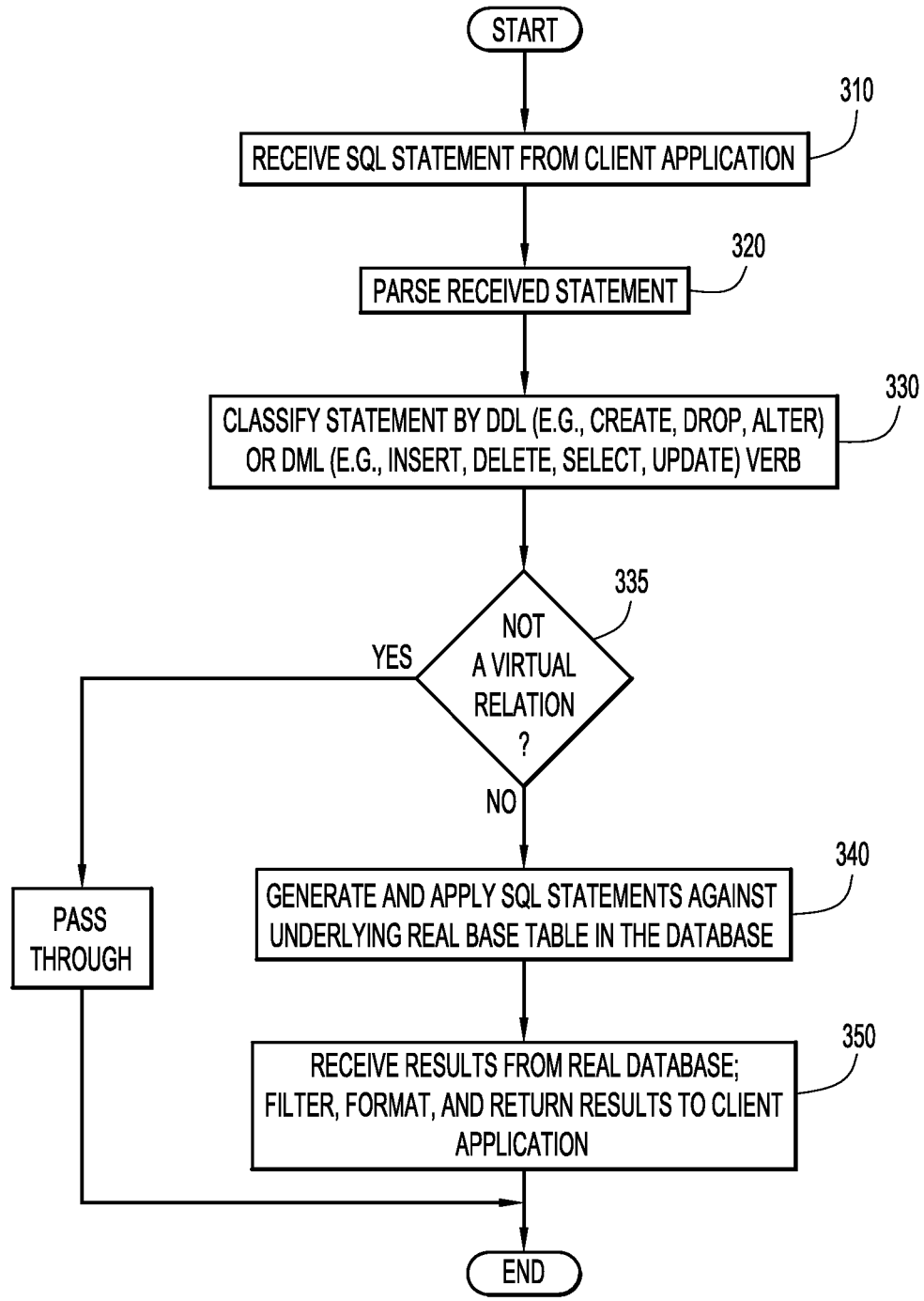
FIG. 3 is a flow diagram illustrating an example manner of processing communications from a client application according to an embodiment of the present invention.

An example manner of processing communications from a client application according to an embodiment of the present invention is illustrated in FIG. 3. Initially, virtual relation server module 122 receives an arbitrary SQL statement associated with one or more virtual relation(s) from client system 132 at step 310. At step 320, the virtual relation server module parses the received statement. At step 330, the virtual relation server module identifies a DDL verb (e.g., CREATE, DROP, ALTER) or DML verb (e.g., INSERT, DELETE, SELECT, UPDATE) in the parsed statement. If the statement does not include such a verb (e.g., the parsed statement begins a transaction, commits a transaction, provides user credentials, sets the isolation level, etc.), the virtual relation server module may pass the statement through to DBMS 112 (e.g., via JDBC 230) at step 335. Likewise, if the statement does not involve a known virtual relation, the virtual relation server module may pass the statement through to the DBMS 112 at step 335. As a result, the client application may transparently access virtual relations, the real underlying relations within the DBMS (e.g., type table 214, field table 216, and base table 218), and other real relations that may be managed by the DBMS (e.g., in database 114). In addition certain statements governing transactional boundaries may be passed through to the DBMS 112 in a similar way. For example, the transactional and ACID properties for DML and DDL operations over the virtual relations are respected as a result of passing through the client application's COMMIT or ROLLBACK operations directly to the DBMS.

At step 340, SQL statement constructor 222 uses the type system metadata to map virtual relation elements to data in database 114, and generate real SQL statement(s) against the real relation in the database 114 from the parsed statement. The SQL statement constructor may access the type system metadata from type system cache 224 or (e.g., if required information is not available in the type system cache) from type system 212 in database 114. The virtual relation server module applies the generated statement against the base table in the database 114 (e.g., via JDBC 230 and DBMS 112). If the initial statement is a DDL statement, the generated statement may affect only the tables of the type system 212 and need not affect base table 218. At step 350, the virtual relation server module may receive results for the generated statement(s), format those results, and return the formatted results to the client application 132. For example, if the initial statement (i.e., the statement received from client application 132 at step 310) is a SELECT statement, the virtual relation server module will receive results of a query against base table 218, reformat those results according to the initial query and the type system metadata, and return the reformatted results to the client application.

Figure 4:
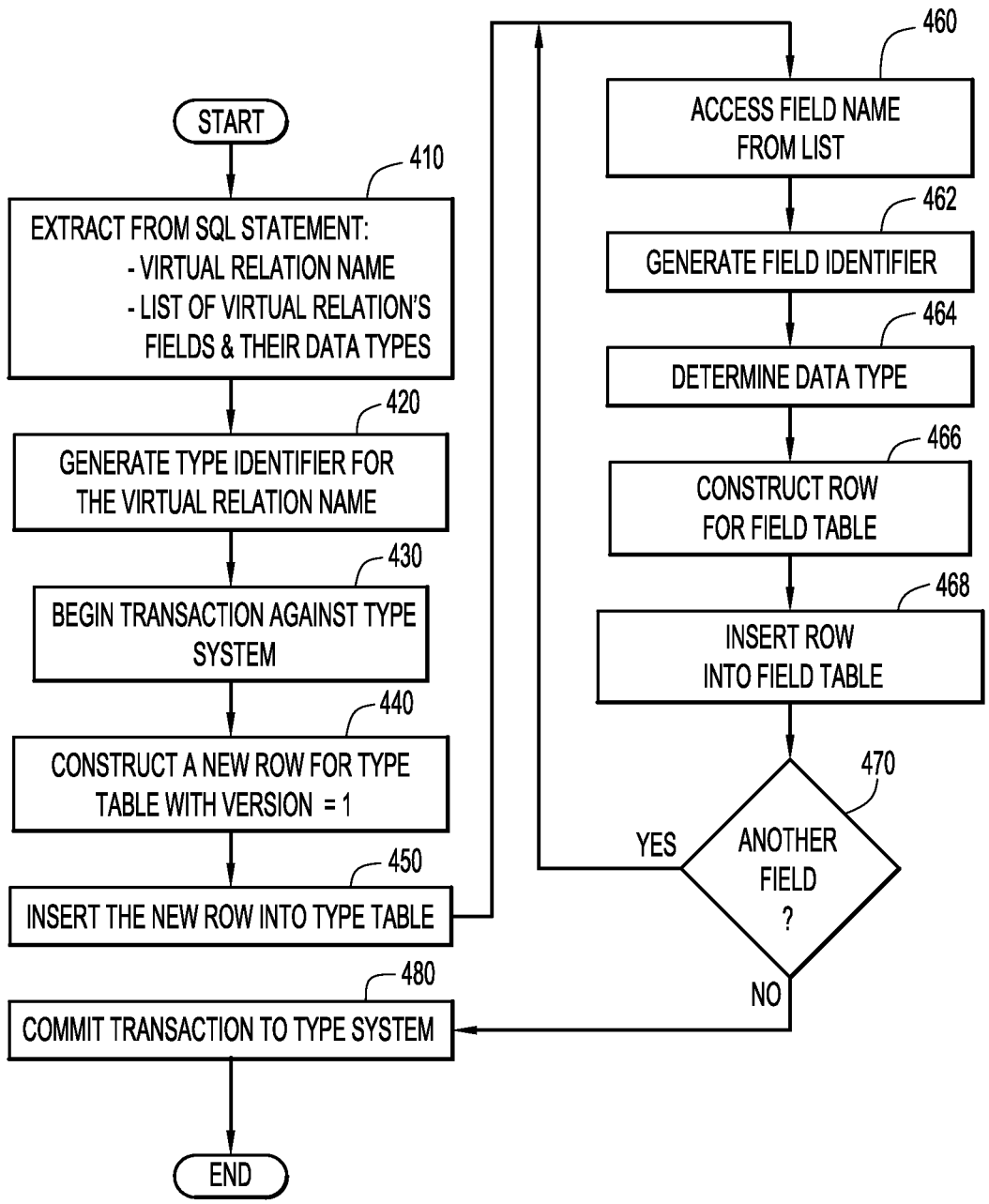
FIG. 4 is a flow diagram illustrating an example manner of generating and applying SQL statements against the underlying database to implement a CREATE operation according to an embodiment of the present invention.

An example manner of generating and applying SQL statements against the underlying database to implement a CREATE virtual relation operation according to an embodiment of the present invention is illustrated in FIG. 4. In particular, at step 410, SQL statement constructor 222 extracts from the initial, parsed SQL statement received from client application 132 the name and description of the virtual relation to be created and a list with the name, data type, and description for each the field of that virtual relation. At step 420, the SQL statement constructor generates a unique type identifier for the virtual relation name. At step 430, the SQL statement constructor begins a transaction against type system 212. At step 440, the SQL statement constructor builds a SQL statement to insert a row in type table 214 containing the name, description, identifier, and version of the virtual relation. The version is set to 1. At step 450, the SQL statement constructor applies the statement against DBMS 112 (e.g., via JDBC 230), inserting the new row into type table 214.

In addition, a row is inserted in field table 216 for each field of the virtual relation. In particular, at step 460, the SQL statement constructor accesses a field from the list field(s) compiled at step 410. At step 462, the SQL statement generator generates a field identifier for the field name. The field identifier is unique among fields of the virtual relation. At step 464, the SQL statement constructor determines the data type with which to store values of the field. For example, if the field list indicates that the initial SQL statement declared the field to have a data type of integer, short integer, Boolean, or the like, the SQL statement constructor may determine that the field values will be stored as integers types (e.g., in column CONTAINER_1 of the base table) and set the field's container identifier to 1. At step 466, the SQL statement constructor builds a SQL statement to insert a row in field table 216 containing the type identifier, type version, field identifier, field name, field description, and container identifier for the field. At step 468, the SQL statement constructor applies the statement against DBMS 112 (e.g., via JDBC 230), inserting the new row into field table 216. At step 470, the SQL statement constructor determines whether the field list contains another field to be processed. If so, processing returns to step 460. Otherwise, processing proceeds to step 480, and the transaction to CREATE a virtual relation is finally committed.

Figure 5:
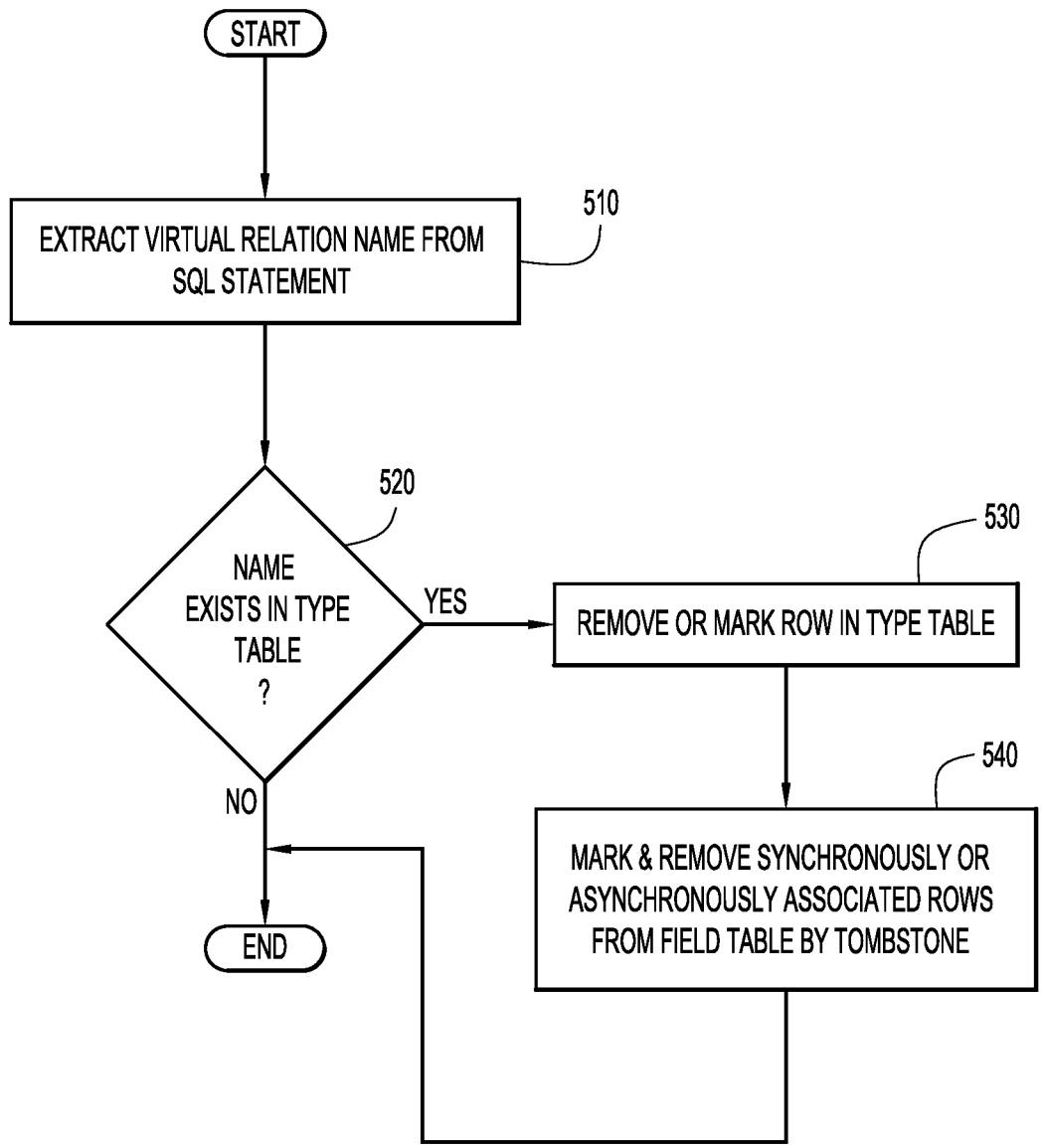
FIG. 5 is a flow diagram illustrating an example manner of generating and applying SQL statements against the underlying database to implement a DROP operation according to an embodiment of the present invention.

An example manner of generating and applying SQL statements against the underlying database to implement a DROP a virtual operation according to an embodiment of the present invention is illustrated in FIG. 5. Initially, SQL statement constructor 222 extracts the virtual relation name from the parsed SQL statement at step 510. At step 520, the SQL statement constructor determines whether that name exists in type table 214. If so, the SQL statement constructor retrieves the type identifier associated with that name (e.g., from type table 214 or type cache system 224), and processing proceeds to step 530. Otherwise, processing ends. At step 530, the SQL statement constructor constructs and applies a SQL statement to remove the row with that type identifier from the type table. At step 540, the SQL statement constructor removes rows with that type identifier from the field table. The rows may be removed from the field table by, e.g., effectively tombstoning the underlying type row as PENDING DATA DELETION state; that is, the type row and/or all associated data in the base table may be marked to indicate that they are no longer valid (e.g., by setting a predetermined attribute to a reserved value). The marked rows in the field table and/or associated rows in the base table may be eventually removed asynchronously. For example, a cleaning operation may run from time to time to remove the marked rows from the field table and/or remove associated rows from the base table.

Figure 6:
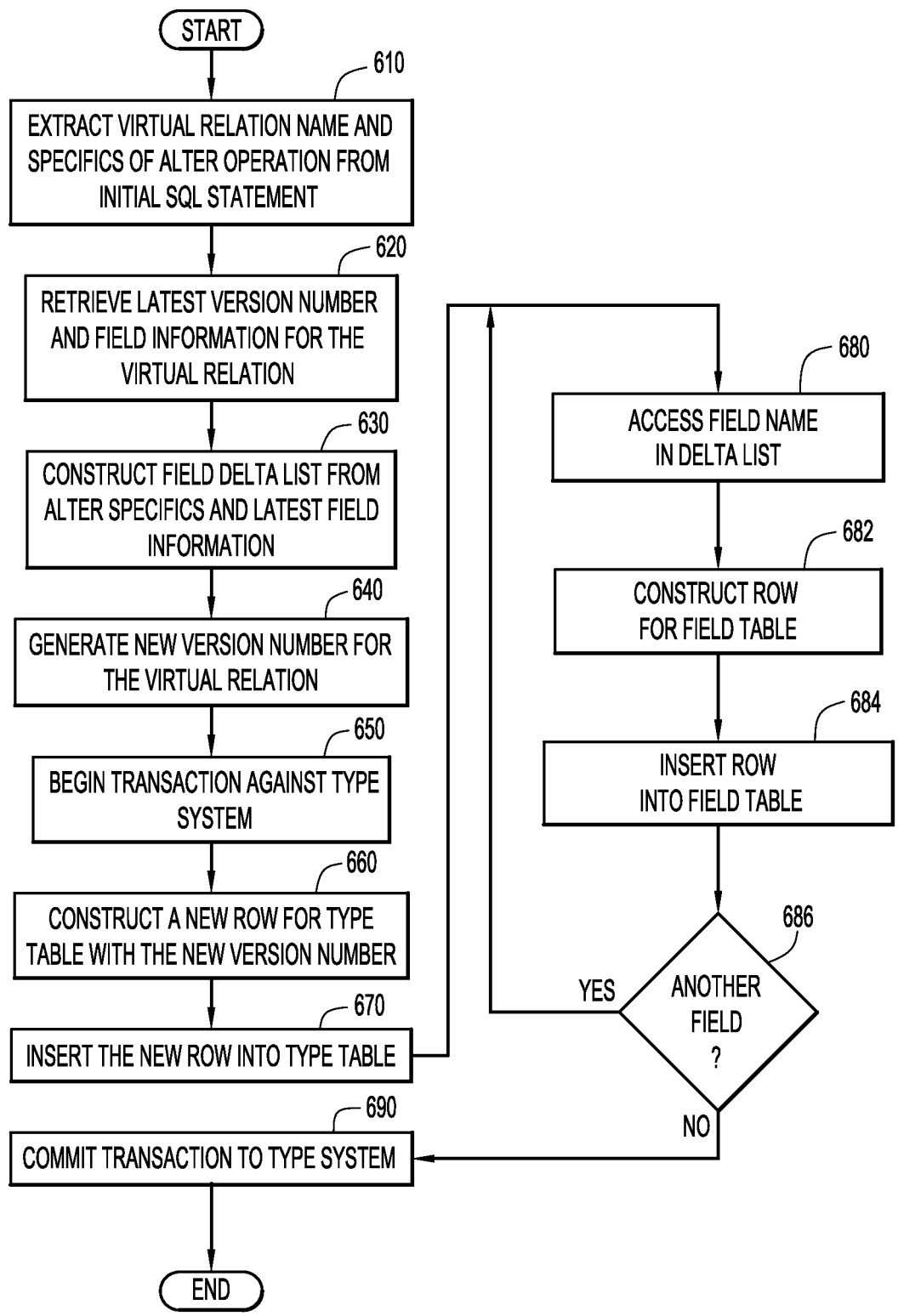
FIG. 6 is a flow diagram illustrating an example manner of generating and applying SQL statements against the underlying database to implement an ALTER operation according to an embodiment of the present invention.

An example manner of generating and applying SQL statements against the underlying database to implement an ALTER virtual relation operation according to an embodiment of the present invention is illustrated in FIG. 6. Initially, SQL statement constructor 222 extracts the virtual relation name and specifics of the alter operation (e.g., columns to drop, columns to add, existing columns for which the data type is to be changed, etc.) from the initial, parsed SQL statement at step 610. At step 620, the SQL statement constructor retrieves the latest version number and field information for the virtual relation from type table 214 and field table 216 respectively. At step 630, the SQL statement constructor compiles a field delta list from the specifics of the alter operation and the retrieved field information for the latest version of the virtual relation. The field delta list includes the name and data storage type for each field that is to belong to the table upon completion of the alter operation; that is, the field delta list includes each field from the previous version of the virtual relation that is not dropped in the current alter operation plus each field added to the virtual relation by the current alter operation. At step 640, the SQL statement constructor generates a new version number for the virtual relation. At step 650, the SQL statement constructor begins a transaction against type system 212. At step 660, the SQL statement constructor builds a SQL statement to insert a row in type table 214 containing the virtual relation's name, description, identifier, and the new version number generated at step 640. At step 670, the SQL statement constructor applies the statement against DBMS 112 (e.g., via JDBC 230), inserting the row into type table 214.

In addition, a row is inserted in field table 216 for each field of the new version of the virtual relation. In particular, at step 680, the SQL statement constructor accesses a field from the field delta list compiled at step 630. At step 682, the SQL statement constructor builds a SQL statement to insert a row in field table 216 containing the type identifier, type version, field identifier, field name, field description, and container identifier for the field. For new fields, a new field identifier is generated. Generally, there are three possibilities: one or more new fields may be added, one or more existing fields may be removed or deleted, and one or more fields may be changed to different data types. For new and altered fields, the container identifier is determined in the same manner as described for fields of a new virtual relation. At step 684, the SQL statement constructor applies the statement against DBMS 112 (e.g., via JDBC 230), inserting the new row into field table 216. At step 686, the SQL statement constructor determines whether the field delta list contains another field to be processed. If so, processing returns to step 680. Otherwise, processing proceeds to step 690, and the ALTER the virtual relation transaction is finally committed. If the initial SQL statement deletes one or more fields, the corresponding data in the field table may be synchronously deleted, or the corresponding data in the field table and/or base table may be tombstoned and eventually asynchronously deleted.

Figure 7:
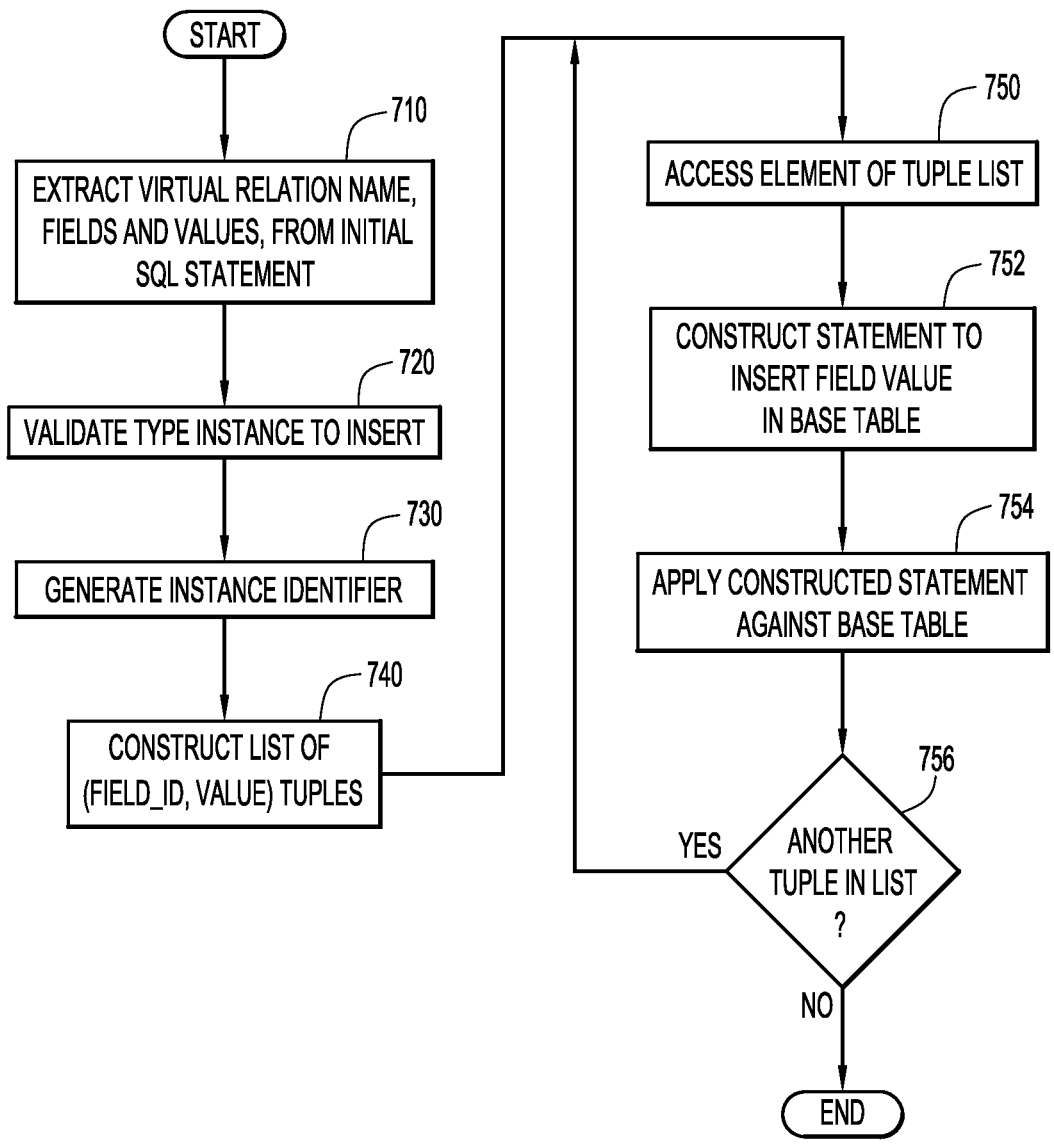
FIG. 7 is a flow diagram illustrating an example manner of generating and applying SQL statements against the underlying database to implement an INSERT operation according to an embodiment of the present invention.

An example manner of generating and applying SQL statements against the underlying database to implement an INSERT virtual relation operation according to an embodiment of the present invention is illustrated in FIG. 7. Initially, SQL statement constructor 222 extracts the virtual relation name, field(s), and value(s) from the initial, parsed SQL statement at step 710. If the initial SQL statement does not explicitly indicate the field names, as in certain standard SQL language forms, the field names may be determined by lookup to the type system 212 or type system cache 224. At step 720, the SQL statement constructor validates the virtual relation name and field names by querying type table 214 for a matching type name and field table 216 for matching field names associated with the type. Alternatively, the virtual relation and field names may be validated against information in type system cache 224. In addition, the SQL statement constructor may determine the type identifier and latest type version of the virtual relation, and the field identifier and container identifier for each field extracted from the initial SQL statement at step 710. These values may be determined, e.g., as a side effect of the validation queries. At step 730, the SQL statement constructor generates a unique instance identifier for the virtual row to be inserted in the virtual relation. At step 740, the SQL statement constructor builds a list of (field identifier, field value) tuples (or other collection of the field values extracted at step 710 and their associated field identifiers).

A row is inserted into base table 218 for each of the field values extracted from the initial SQL statement. In particular, at step 750, the SQL statement constructor accesses a (field identifier, field value) tuple from the list constructed at step 740. At step 752, the SQL statement constructor builds a SQL statement to insert the field value into the base table. For example, the constructed statement may have the form:

```
INSERT INTO BASE_TABLE
(
TYPE_ID,
TYPE_VERSION,
FIELD_ID,
INSTANCE_ID,
CONTAINER_[X]
)
VALUES (?,?,?,?,?)
``` where [X] indicates the container identifier (e.g., 1, 2, or 3), and the question marks are placeholders for the type identifier, latest type version, field identifier, instance identifier, and actual field value respectively. At step 754, the SQL statement constructor applies the statement against base table 218. At step 756, the SQL statement constructor determines whether another tuple in the list remains to be processed. If so, processing returns to step 750. The rows may be inserted into the base table in batch (e.g., via JDBC 230) to improve performance. For example, each SQL statement generated at step 752 may be added to a JDBC batch statement at step 754, and the batch statement may be executed in response to a determination at step 756 that no tuples remain in the list.

Figure 8:
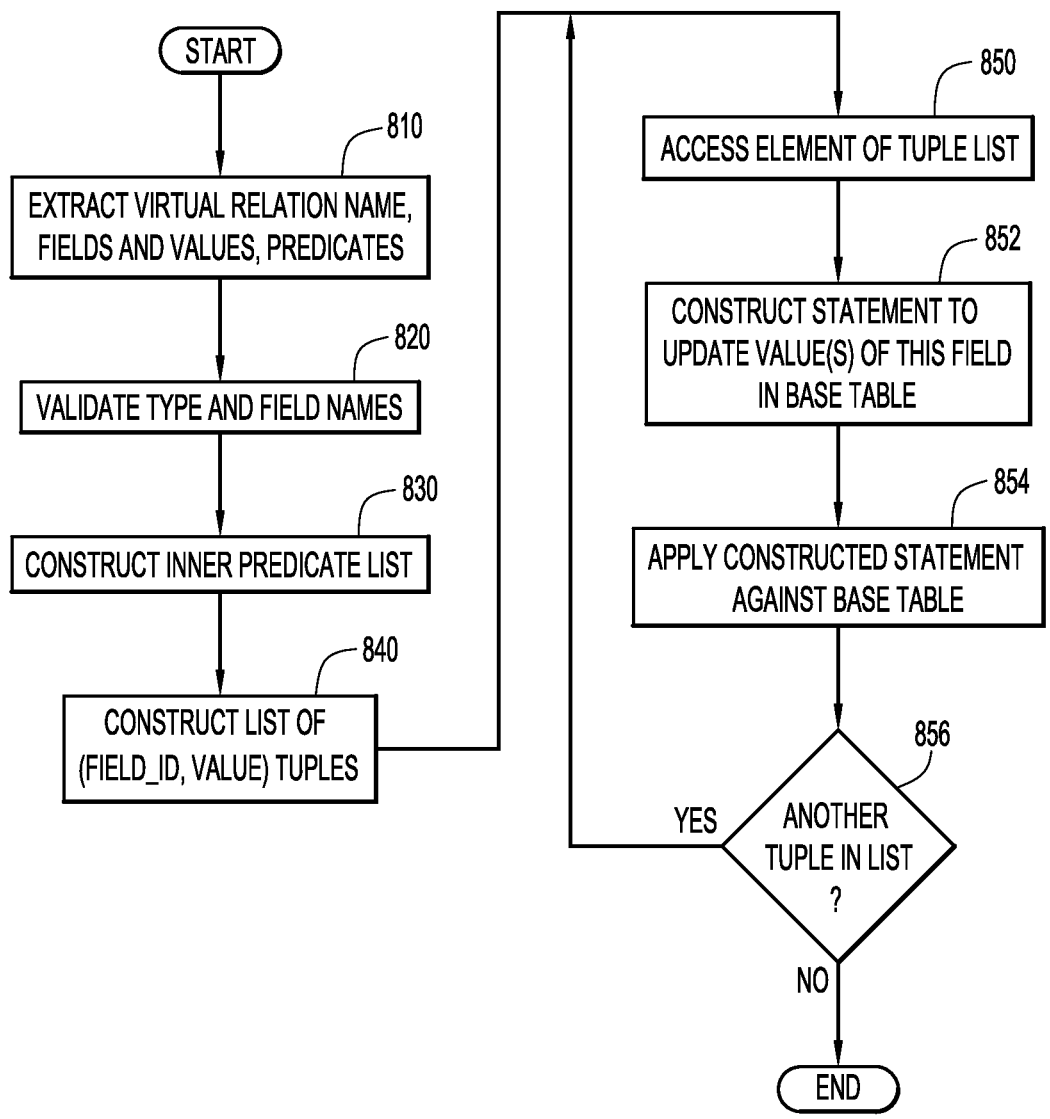
FIG. 8 is a flow diagram illustrating an example manner of generating and applying SQL statements against the underlying database to implement an UPDATE operation according to an embodiment of the present invention.

An example manner of generating and applying SQL statements against the underlying database to implement an UPDATE virtual relation operation according to an embodiment of the present invention is illustrated in FIG. 8. Initially, SQL statement constructor 222 extracts the virtual relation name, field names, field values, and predicate clauses from the initial, parsed SQL statement at step 810. At step 820, the SQL statement constructor validates the virtual relation name and field names by querying type table 214 for a matching type name and field table 216 for matching field names associated with the type. Alternatively, the virtual relation and field names may be validated against information in type system cache 224. In addition, the SQL statement constructor may determine the type identifier and latest type version of the virtual relation, and the field identifier and container identifier for each field extracted from the initial SQL statement (including fields in predicates clauses) at step 810. These values may be determined, e.g., as a side effect of the validation queries.

At step 830, an inner predicate list is constructed and provided to the SQL statement constructor (e.g., by a predicate block handler module) as a fully bracketed expression (FBE) tree. This tree is a fully bracketed Boolean expression tree of virtual relation field predicates that are transformed to appropriate SQL predicates to the real base table 218 and return virtual tuple instance identifiers for instances of the virtual relation that satisfy the predicate of the initial SQL statement. For example, if the initial SQL statement is

```
UPDATE TableA
    SET c1 = 4, c2 = 2
    WHERE c3 = "abc" AND c4 = 2.7
the predicate (c3 = "abc" AND c4 = 2.7) may be transformed to the SQL
string
    (
    /* Predicate 1 */
    SELECT instance_id FROM base_table
    WHERE type_id = ? AND type_version = ? AND
        field_id = ? AND container_3 = "abc"
    INTERSECT
    /* Predicate 2 */
    SELECT instance_id FROM base_table
    WHERE type_id = ? AND type_version = ? AND
        field_id = ? AND container_2 = 2.7
    )
``` where the question marks are placeholders for the type identifier, type version, and field identifiers determined, e.g., at step 820. The string may be formed by walking the tree and emitting a select clause for each of the conditions (e.g., the condition c3 ="abc" and the condition c4=2.7) The results of the select clauses are combined forming their set intersection if the conditions are operands of AND and by forming their set union if the conditions are operands of OR. Present invention embodiments may use any form of SQL subquery that meets SQL syntax conventions and maintains the required relational algebra. Alternatively, common table expressions (CTE) may be used if the underlying DBMS supports the functionality.

At step 840, the SQL statement constructor builds a list of (field identifier, field value) tuples (or other collection of the field values and their associated field identifiers) for the fields to updated.

An update statement is applied to base table 218 for each of the fields to be updated in the initial SQL statement (e.g., c1 and c2). In particular, at step 850, the SQL statement constructor accesses a (field identifier, field value) tuple from the list constructed at step 840. At step 852, the SQL statement constructor builds a SQL statement to update values of that field in the base table that belong to an instance of the virtual relation satisfying the conditions specified in the initial SQL statement. For example, the constructed statement may have the

```
UPDATE BASE_TABLE
    SET CONTAINER_[X] = ?
WHERE
    TYPE_ID = ?
AND FIELD_ID = ?
AND TYPE_VERSION = ?
AND instance_id IN
(
SELECT instance_id FROM base_table WHERE instance_id IN
(
/* Predicate 1 */
SELECT instance_id FROM base_table
    WHERE type_id = ? AND type_version = ? AND
        field_id = ? AND container_[Y] = ?
UNION/INTERSECT
/* Predicate 2 */
...
)
)
``` where [X] and [Y] indicate a container identifier (e.g., 1, 2, or 3 for integer, float, string, respectively), and the question marks are placeholders for the type identifier, latest type version, field identifier, instance identifier, and field identifiers, and field value. The statement selects virtual tuple instance identifiers for instances (or virtual rows of the virtual relation) that satisfy conditions specified in the initial SQL statement using the transformed predicate determined at step 830, and updates the value in the container column for each row in the base table associated with the current field and a selected instance identifier.

At step 854, the SQL statement constructor applies the statement against base table 218. At step 856, the SQL statement constructor determines whether another tuple in the list remains to be processed. If so, processing returns to step 850. The update statements may be applied against the base table in batch (e.g., via JDBC 230) to improve performance. For example, each SQL statement generated at step 852 may be added to a JDBC batch statement at step 854, and the batch statement may be executed in response to a determination at step 856 that no tuples remain in the list compiled at step 840.

Figure 9:
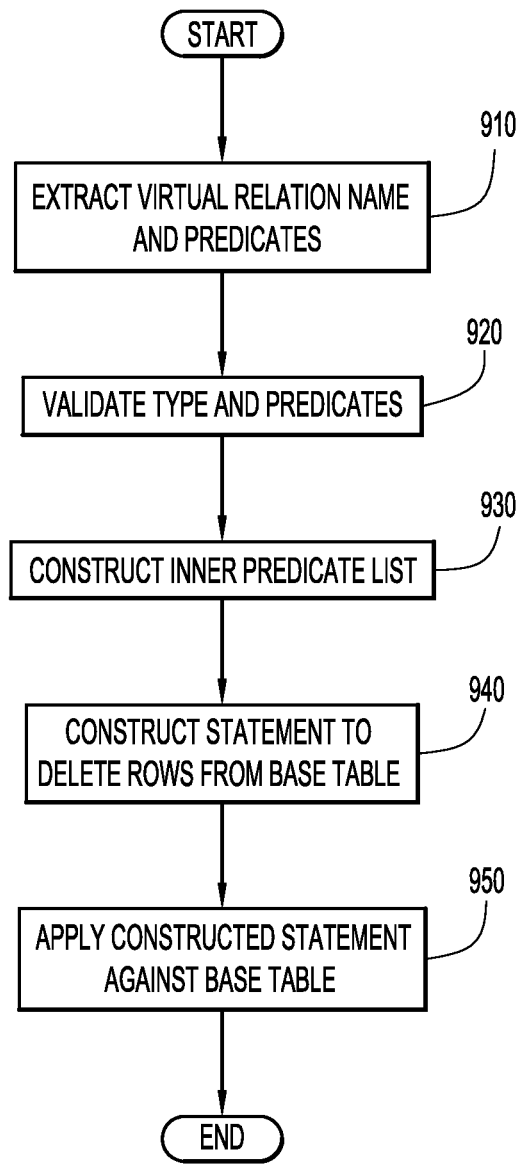
FIG. 9 is a flow diagram illustrating an example manner of generating and applying SQL statements against the underlying database to implement a DELETE operation according to an embodiment of the present invention.

An example manner of generating and applying SQL statements against the underlying database to implement a DELETE operation according to an embodiment of the present invention is illustrated in FIG. 9. Initially, SQL statement constructor 222 extracts the virtual relation name and predicates from the initial, parsed SQL statement at step 910. At step 920, the SQL statement constructor validates the virtual relation name and predicates (e.g., field names, data types, etc.) by querying type table 214 for a matching type name and field table 216 for matching field names associated with the type. Alternatively, the virtual relation and field names may be validated against information in type system cache 224. In addition, the SQL statement constructor may determine the type identifier and latest type version of the virtual relation, and the field identifier and container identifier for each field extracted from the initial SQL statement (i.e., fields in predicates clauses) at step 920. These values may be determined, e.g., as a side effect of the validation queries.

At step 930, an inner predicate list is constructed and provided to the SQL statement constructor (e.g., by a predicate block handler module) as a fully bracketed expression (FBE) tree. The tree may be transformed to a SQL string for querying the base table to obtain virtual tuple instance identifiers for instances of the virtual relation that satisfy the predicate of the initial SQL statement (e.g., in the manners discussed above with respect to transforming predicates of an UPDATE statement).

At step 940, the SQL statement constructor builds a SQL statement to delete rows of the base table that belong to an instance of the virtual relation satisfying the conditions specified in the initial SQL statement. For example, the constructed statement may have the form:

```
DELETE FROM BASE_TABLE WHERE instance_id IN
(
SELECT instance_id FROM base_table WHERE
(
/* Predicate 1 */
SELECT instance_id FROM base_table
    WHERE type_id = ? AND type_version = ? AND
        field_id = ? AND container_[Y] = ?
UNION/INTERSECT
/* Predicate 2 */
. . .
)
)
``` where [Y] indicates a container identifier (e.g., 1, 2, or 3 for integer, float, string, respectively), and the question marks are placeholders for the type identifier, latest type version, field identifier, and field value. The statement selects virtual tuple instance identifiers for instances (or virtual rows of the virtual relation) that satisfy conditions specified in the initial SQL statement using the transformed predicate determined at step 930, and deletes rows in the base table associated with a selected instance identifier. At step 950, the SQL statement constructor applies the statement against base table 218.

Figure 10:
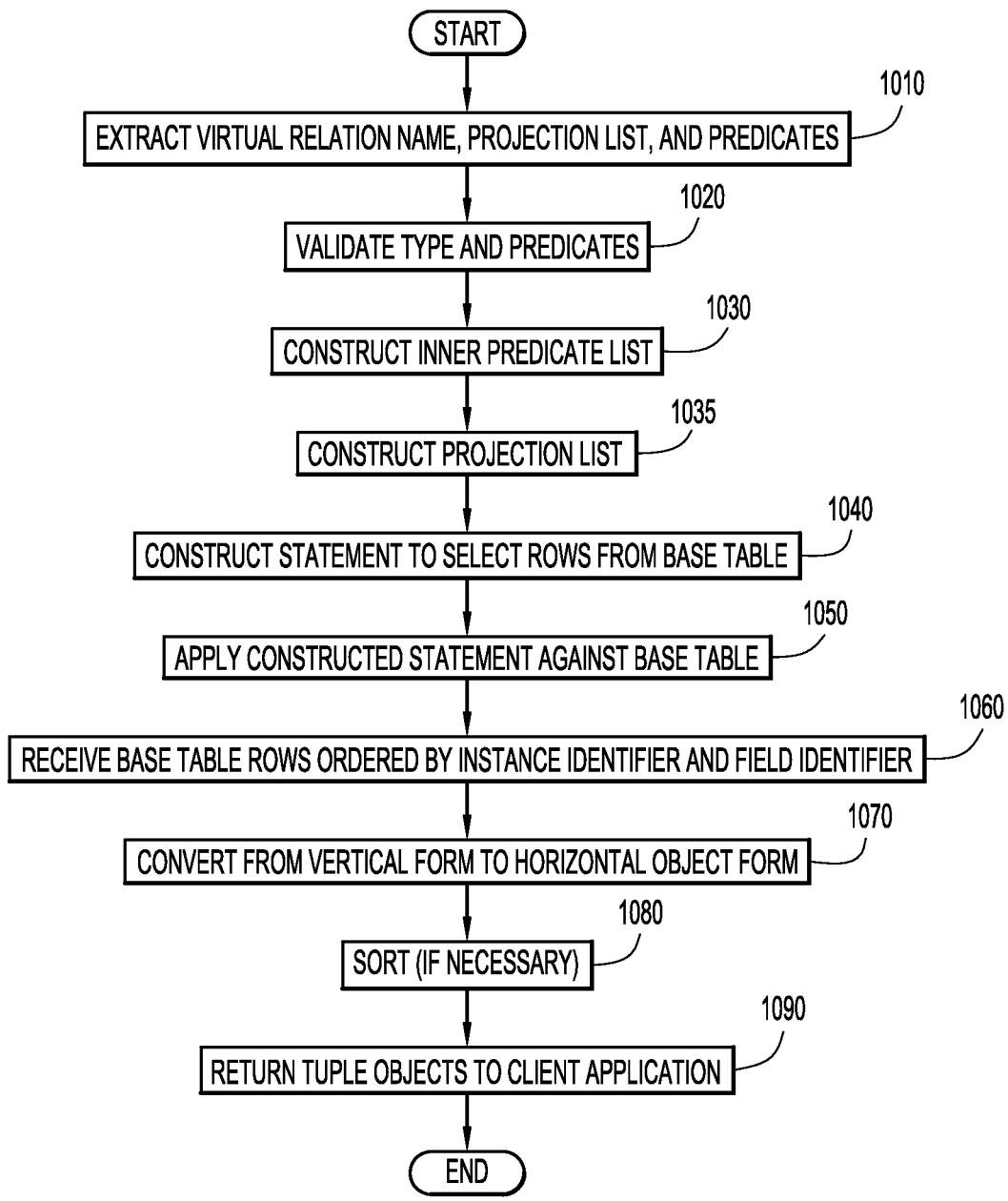
FIG. 10 is a flow diagram illustrating an example manner of generating and applying SQL statements against the underlying database to implement a SELECT operation according to an embodiment of the present invention.

An example manner of generating and applying SQL statements against the underlying database to implement a SELECT operation according to an embodiment of the present invention is illustrated in FIG. 10. Initially, SQL statement constructor 222 extracts the virtual relation name and predicates from the initial, parsed SQL statement at step 1010. At step 1020, the SQL statement constructor validates the virtual relation name and predicates (e.g., field names, data types, etc.) by querying type table 214 for a matching type name and field table 216 for matching field names associated with the type. Alternatively, the virtual relation and field names may be validated against information in type system cache 224. If the initial SQL statement does not explicitly indicate the field names, as in certain standard SQL language forms, the field names may be determined by lookup to the type system 212 or type system cache 224. In addition, the SQL statement constructor may determine the type identifier and latest type version of the virtual relation, and the field identifier and container identifier for each field extracted from the initial SQL statement (i.e., predicates fields and projection fields) at step 1020. These values may be determined, e.g., as a side effect of the validation queries. Projection fields as specified in the initial SQL statement may provide additional filter predicates that may be applied to the base table as deemed necessary for optimization.

At step 1030, an inner predicate list is constructed and provided to the SQL statement constructor (e.g., by a predicate block handler module) as a fully bracketed expression (FBE) tree. The tree may be transformed to a SQL string for querying the base table to obtain virtual tuple instance identifiers for instances of the virtual relation that satisfy each of the predicate(s) of the initial SQL statement (e.g., in the manners discussed above with respect to transforming predicates of an UPDATE statement).

At step 1035, a projection list is constructed and provided to the SQL statement constructor (e.g., by a projection block handler module) as a SQL predicate string for selecting field associate with the virtual relation. For example, if the initial SQL statement is SELECT c1, c2 from TableA WHERE c3 ="abc", the SQL predicate string selects rows from the base table that have the table identifier for TableA, the latest version number for TableA, and a field identifier corresponding to column c1 or c2 of TableA.

At step 1040, the SQL statement constructor builds a SQL statement to select rows of the base table that contain a projected field value belonging to an instance of the virtual relation satisfying the conditions specified in the initial SQL statement. For example, the constructed statement may have the form:

```
SELECT * FROM base_table WHERE
    type_id = ? AND type_version = ? AND field_id IN (?)
    AND instance_id IN
    (
    SELECT instance_id FROM base_table WHERE
    (
    /* Predicate 1 */
    SELECT instance_id FROM base_table
        WHERE type_id = ? AND type_version = ? AND
            field_id = ? AND container_[Y] = ?
    UNION/INTERSECT
    /* Predicate 2 */
    . . .
    )
    )
``` where [Y] indicates a container identifier (e.g., 1, 2, or 3 for integer, float, string, respectively), and the question marks are placeholders for the type identifier, latest type version, and field identifiers in the projection list, and field identifiers of fields in the predicates. The statement selects virtual tuple instance identifiers for instances (or virtual rows of the virtual relation) that satisfy conditions specified in the initial SQL statement using the transformed predicate determined at step 1030, and selects rows in the base table associated with a selected instance identifier and projected field of the virtual relation. At step 1050, the SQL statement constructor applies the statement against base table 218.

At step 1060, the virtual relation server module receives results for the query against the base table from the DBMS. The received results are returned in a vertical format, e.g., (type identifier, type version, field identifier, instance identifier, container_1 value, container_2 value, container_3 value) tuples with an implicit ordering according to instance identifier and field identifier. At step 1070, tuple object constructor 228 converts (e.g., using a hash table) the results to a horizontal form, e.g., tuples of (c1, c2) values having a common instance identifier. At step 1080, the converted results may be sorted (e.g., if the initial SQL statement requested results in sorted order). Alternatively, the virtual relation server module may implement a SELECT statement with an ORDER clause by generating a SQL statement for the base table that delegates the sorting to DBMS 112.

The converted results are returned to the client application at step 1090.

It will be appreciated that the embodiments described above and illustrated in the drawings represent only a few of the many ways of implementing embodiments for mapping virtual relations to a table in a database.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for implementing any database operations for a virtualized schema. For example, join operations across any fields of any number of virtual relations may be implemented in a manner similar to those of the operations described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a first structured query language (SQL) statement including a virtual relation;
   mapping the virtual relation to a base table of a relational database management system by:
      referencing a row of a first table of metadata corresponding to the virtual relation and having first information regarding the virtual relation,
      referencing at least one row of a second table of metadata, each of the at least one row of the second table of metadata including second information regarding a respective field of at least one field associated with the virtual relation, and
      referencing at least one row of the base table, each of the at least one row of the base table including an instance of a field value corresponding to the respective field of the at least one field associated with the virtual relation;
   generating a second SQL statement for the base table from the first SQL statement including the virtual relation by applying the mapping to one or more elements of the first SQL statement for the virtual relation; and
   applying the second SQL statement against real relations of the base table.

2. The computer-implemented method of claim 1, further comprising:
   mapping to the base table each of a plurality of virtual relations specified via one or more data definition language (DDL) statements.

3. The computer-implemented method of claim 1, wherein the first SQL statement for the virtual relation is used to generate the second SQL statement for the base table and includes data manipulation language (DML) statements.

4. The computer-implemented method of claim 1, wherein the generating of the second SQL statement for the base table includes transforming one or more predicates of the first SQL statement for the virtual relation into a SQL string to select identifiers of rows of the base table containing values belonging to one or more instances of the virtual relation that satisfy the one or more predicates of the first SQL statement for the virtual relation.

5. The computer-implemented method of claim 1, wherein the first SQL statement for the virtual relation is a SELECT statement, and the method further comprises:
   receiving results of applying the generated second SQL statement against the base table; and
   transforming the received results into a result set for the first SQL statement for the virtual relation.

6. The computer-implemented method of claim 1, wherein the first SQL statement for the virtual relation is received from a client application and includes a selected one of a DML operation and a DDL operation, and transactional and ACID properties of the selected operation are respected by passing a selected one of a COMMIT operation and a ROLLBACK operation of the client application through to a database management system that manages the base table.

7. The computer-implemented method of claim 1, further comprising passing a SQL statement lacking an association with any virtual relation through from a client application to a database management system to provide the client application access to the base table and the virtual relation.

8. The computer-implemented method of claim 1, wherein the first SQL statement for the virtual relation comprises a SELECT statement, and the generated second SQL statement for the base table includes a predicate filter based on a projection specification in the SELECT statement to reduce data retrieval from the base table.

9. The computer-implemented method of claim 1, wherein the base table includes a plurality of container columns storing distinct data types, and each of the at least one field is mapped to a corresponding one of the plurality of container columns storing a data type for that field.

10. The computer-implemented method of claim 1, further comprising:
    identifying whether the first SQL statement includes a data definition language verb; and
    modifying, when the first SQL statement is identified as including the data definition language verb, at least one of the first table and the second table without modifying the base table.

* * * * *